J. A. McGee.
Revolving Rake.
No. 103,065. Patented May 17, 1870.
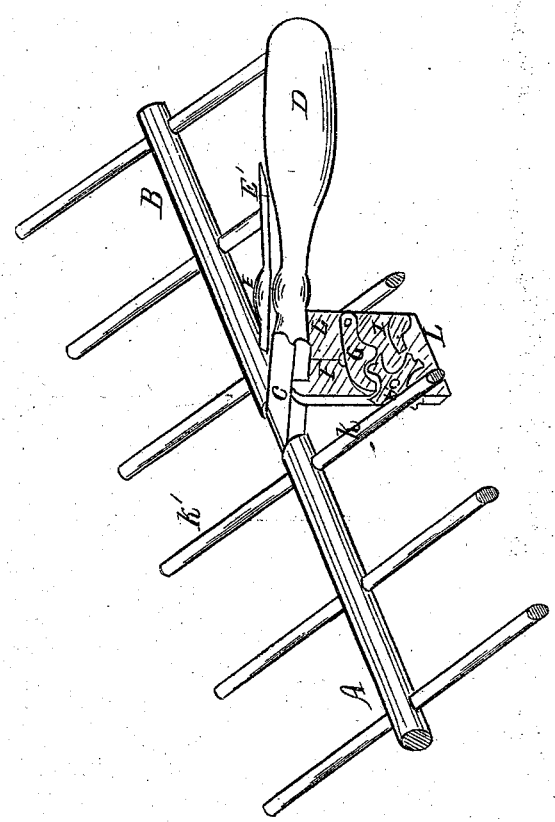
Attest
Geo. Rieger
George Rieger
Joseph A. McGee
Inventor

UNITED STATES PATENT OFFICE.

JOSEPH A. McGEE, OF SHARPSVILLE, INDIANA.

IMPROVEMENT IN HORSE HAY-RAKES.

Specification forming part of Letters Patent No. 103,065, dated May 17, 1870.

*To all whom it may concern:*

Be it known that I, JOSEPH A. McGEE, of Sharpsville, in the county of Tipton, and in the State of Indiana, have invented an Improvement in Horse Hay-Rakes; and I do hereby declare that the following is a full, clear, and exact description thereof, reference being had to the accompanying drawing, and to the letters of reference marked thereon.

The nature of the invention consists in the construction and arrangement of the devices hereinafter described for holding the teeth of a rake in the proper position while being filled with hay, and then readily releasing them, so that they will at the proper time discharge the hay, said device to be made of wood and iron, or any other suitable materials.

To enable others skilled in the art to make and use my said device, I proceed to describe it more particularly, as follows, viz:

A B of the accompanying drawing is the body of the rake; C D, the handle; L, an upright piece of wood of the form represented in the drawing; E, a small lever on the top of the handle C D. G and I are pawls which hold the sectional wheel H in its proper position; F, a rod attached to the pawl G and the lever E; K, one tooth of the rake; K', another.

To use my said device, the various parts are all in their position, as represented in the drawing, with the tooth K resting in a notch in the segmental wheel H, as there represented. The horse is attached by means of any convenient device to the bar A and B. As the rake is drawn forward to the place where it is intended to lay the windrow, the operator, by oscillating the lever E, raises the pawl G, which is attached to it by the rod F. This releases the segmental wheel H, so that the tooth K resting in it is free to revolve on the bar A B, and, in turning, discharges the hay. The tooth K' will naturally, of itself, as it revolves, fall into a notch of the segmental wheel H, and be held until again released by raising the pawl G, which will always, when free, of its own gravity fall into the wheel H and hold it from turning one way, while the pawl I holds it from turning the other.

What I claim, and desire to secure by Letters Patent, is—

The lever E, the rod F, the pawls G and I, and the segmental wheel H, when constructed, combined, and arranged in the manner and form substantially as set forth.

In testimony that I claim the foregoing specification I have hereunto set my hand this 26th day of March, 1870.

JOSEPH A. McGEE.

Witnesses:
GEO. A. ZIEGLER,
GEORGE RIEGER.